United States Patent
Hung

(10) Patent No.: US 6,967,635 B2
(45) Date of Patent: Nov. 22, 2005

(54) COMPUTER MONITOR SCREEN

(75) Inventor: Teng-Shun Hung, Taichung (TW)

(73) Assignee: Horng Technical Enterprise Co., Ltd., Tai Bao (TW)

( * ) Notice: Subject to any disclaimer, the term of this patent is extended or adjusted under 35 U.S.C. 154(b) by 375 days.

(21) Appl. No.: 10/423,606

(22) Filed: Apr. 25, 2003

(65) Prior Publication Data

US 2004/0212552 A1 Oct. 28, 2004

(51) Int. Cl.[7] .............................................. G09G 3/00
(52) U.S. Cl. ........................ 345/32; 359/609; D14/450
(58) Field of Search ....................... 345/32; 248/200, 248/466; D14/450; 359/609; 361/681

(56) References Cited

U.S. PATENT DOCUMENTS

| | | | | |
|---|---|---|---|---|
| 5,320,318 A | * | 6/1994 | Chen ........................ 248/286.1 |
| D361,993 S | * | 9/1995 | Egly et al. .................. D14/450 |
| 5,448,405 A | * | 9/1995 | Clausen et al. .............. 359/601 |
| 5,526,180 A | * | 6/1996 | Rausnitz ...................... 359/609 |
| 5,543,863 A | * | 8/1996 | Lin ............................. 348/835 |
| 5,627,606 A | * | 5/1997 | Pember et al. ............... 348/818 |
| 5,668,612 A | * | 9/1997 | Hung .......................... 348/818 |
| 5,746,408 A | * | 5/1998 | Theirl et al. ........... 248/295.11 |
| 5,803,424 A | * | 9/1998 | Keehn et al. ................ 248/489 |
| 5,909,315 A | * | 6/1999 | Keehn ......................... 359/609 |
| 5,971,548 A | * | 10/1999 | Hung .......................... 359/609 |
| 6,302,546 B1 | * | 10/2001 | Kordiak ....................... 359/608 |
| 2002/0176170 A1 | * | 11/2002 | Huang ......................... 359/609 |

* cited by examiner

Primary Examiner—Ricardo Osorio
Assistant Examiner—Tom Sheng
(74) Attorney, Agent, or Firm—Alan D. Kamrath; Nikolai & Mersereau, P.A.

(57) ABSTRACT

A computer monitor screen has a screen lens, a connection seat having an upper rack and a lower groove, a pair of hanging mounts, and a plurality of fastening devices. The screen lens has a plurality of through holes. The connection seat further has a plurality of through apertures to match the through holes of the screen lens. Each of the hanging mounts has a slide slot to receive the upper rack. The screen lens is inserted in the lower groove of the connection seat. Each of the fastening devices passes through the corresponding through aperture of the connection seat and the corresponding through hole of the screen lens to fasten the connection seat and the screen lens.

4 Claims, 5 Drawing Sheets

COMPUTER MONITOR SCREEN

BACKGROUND OF THE INVENTION

The present invention relates to a computer monitor screen. More particularly, the present invention relates to a computer monitor screen which has a connection seat and a pair of hanging mounts engaging with the connection seat.

Referring to FIG. 1, a conventional computer monitor screen 100 has a screen lens 11, a frame 12 enclosing the screen lens 11, a connection plate 13 disposed on the frame 12, and a positioning plate 14 connected to the connection plate 13. The positioning plate 14 is adhered on a computer monitor (not shown in the figure). Some dust will be adsorbed on the screen lens 11 after a long period of usage. The positioning plate 14 should be detached from the computer monitor in order to clean the screen lens 11. Once the positioning plate 14 is detached from the computer monitor, it is difficult to adhere the positioning plate 14 on the computer monitor stably because a residual adhesive remains on the computer monitor while the positioning plate 14 is detached from the computer monitor. Furthermore, the frame 12 is very heavy so that the conventional computer monitor screen 100 is adapted to a liquid crystal display. Since the positioning plate 14 supports the connection plate 13 directly but the positioning plate 14 does not support the frame 12 directly, the frame 12 and the screen lens 11 will shake easily.

SUMMARY OF THE INVENTION

An object of the present invention is to provide a computer monitor screen which has a connection seat and a pair of hanging mounts engaging with the connection seat so that the hanging mounts will be moved along the connection seat in order to adjust a distance betwwen the hanging mounts.

Another object of the present invention is to provide a computer monitor screen which has an upper rack having a plurality of semicircular recesses and a plurality of rectangular recesses and a pair of hanging mounts each having a plurality of semicircular ribs and a plurality of rectangular ribs so that the hanging mounts engaging with the upper rack stably.

Accordingly, a computer monitor screen has a screen lens, a connection seat having an upper rack and a lower groove, a pair of hanging mounts, and a plurality of fastening devices. The screen lens has a plurality of through holes. The connection seat further has a plurality of through apertures to match the through holes of the screen lens. Each of the hanging mounts has a slide slot to receive the upper rack. The screen lens is inserted in the lower groove of the connection seat. Each of the fastening devices passes through the corresponding through aperture of the connection seat and the corresponding through hole of the screen lens to fasten the connection seat and the screen lens.

DETAILED DESCRIPTION OF THE INVENTION

Figure 1:
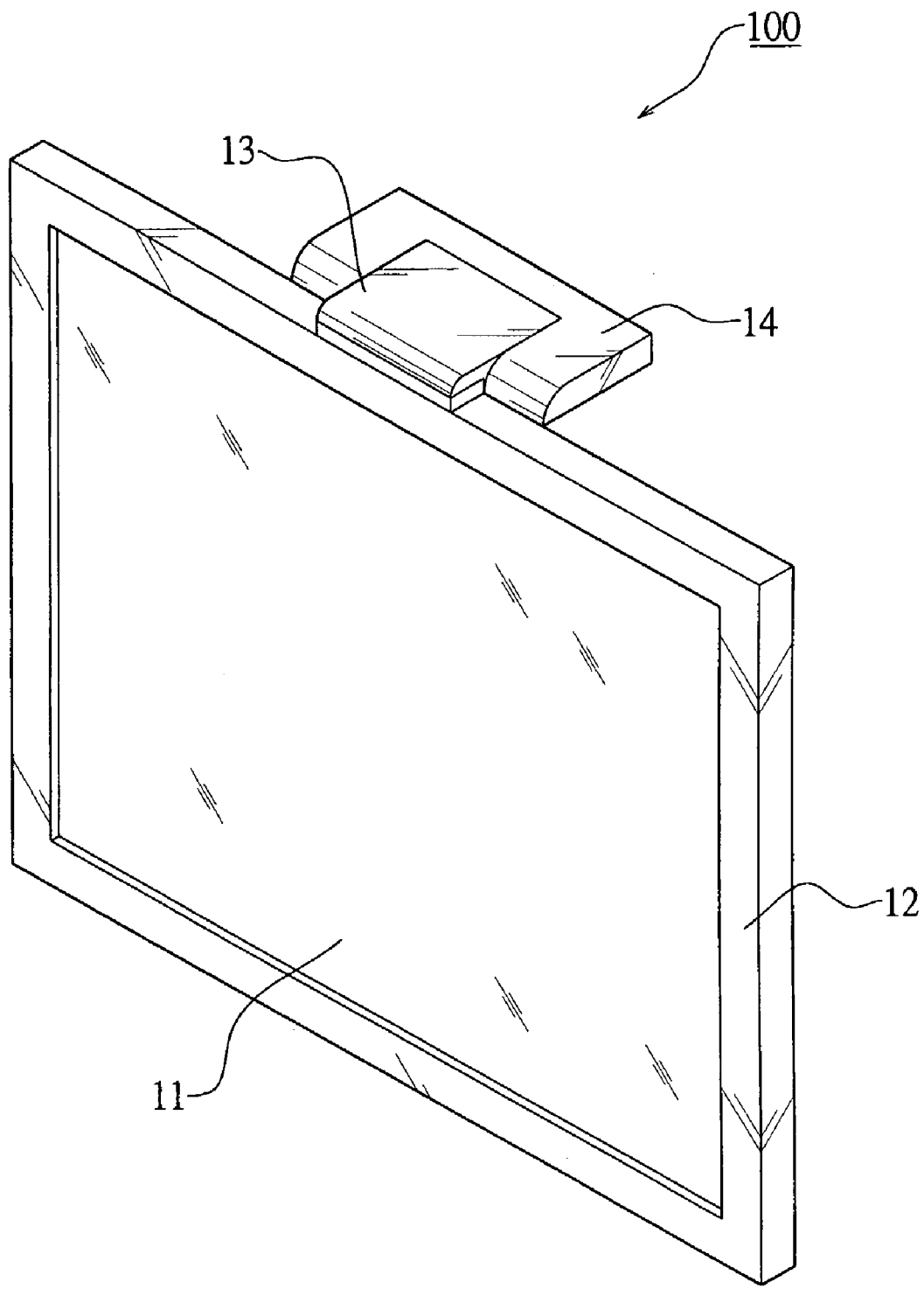
FIG. 1 is a perspective view of a conventional computer monitor screen of the prior art.
Figure 2:
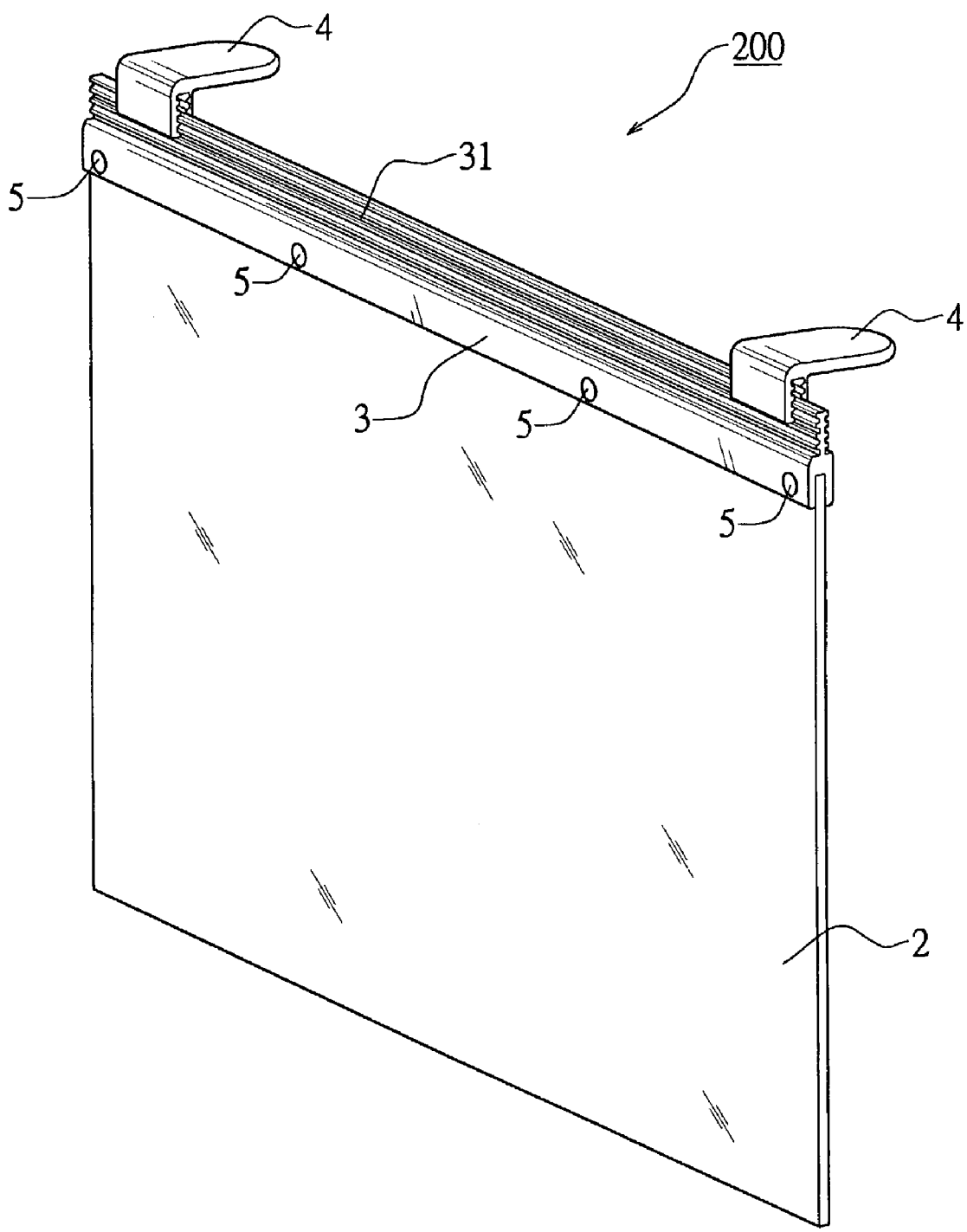
FIG. 2 is a perspective assembly view of a computer monitor screen of a preferred embodiment in accordance with the present invention.
Figure 3:
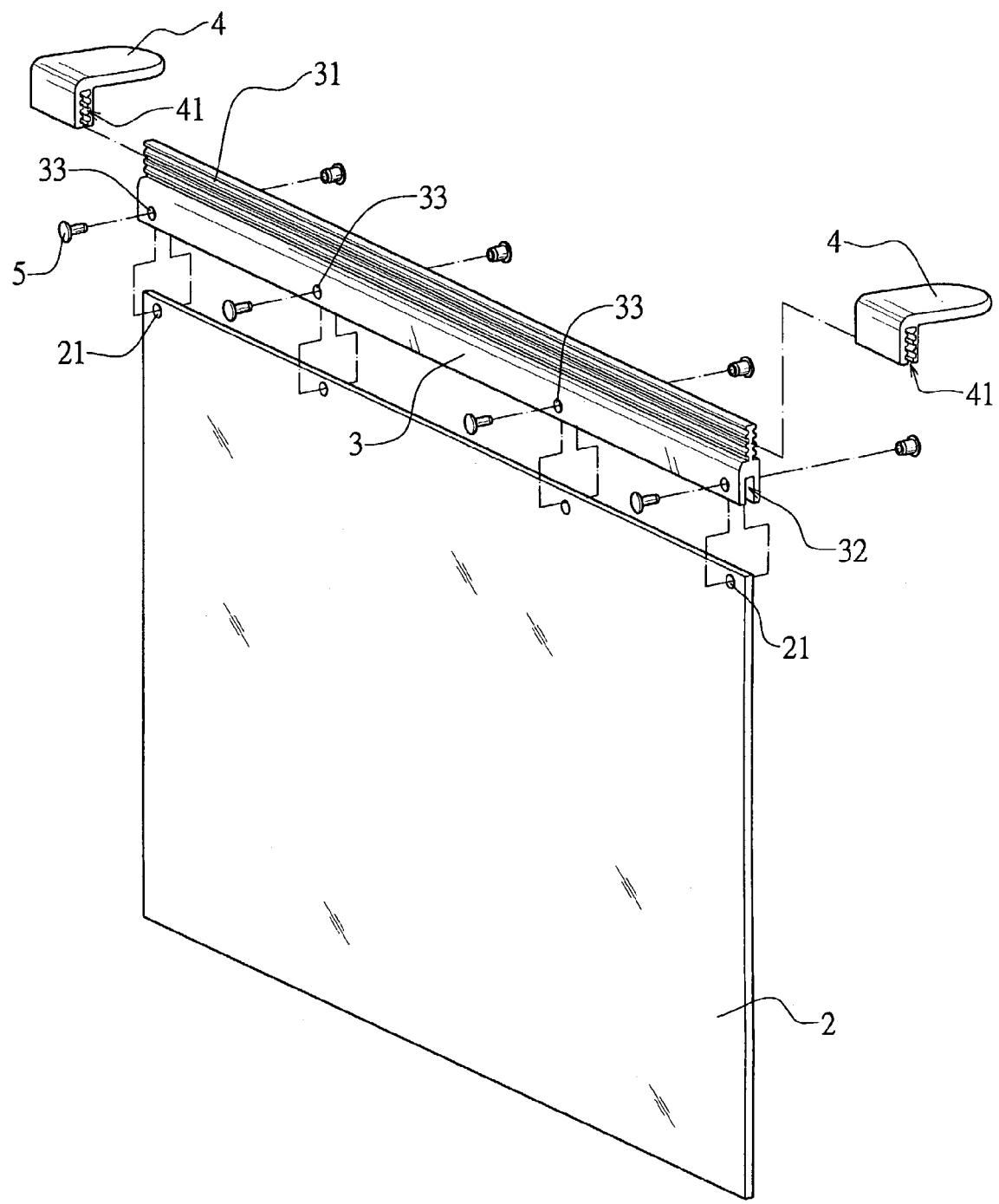
FIG. 3 is a perspective exploded view of a computer monitor screen of a preferred embodiment in accordance with the present invention.
Figure 4:
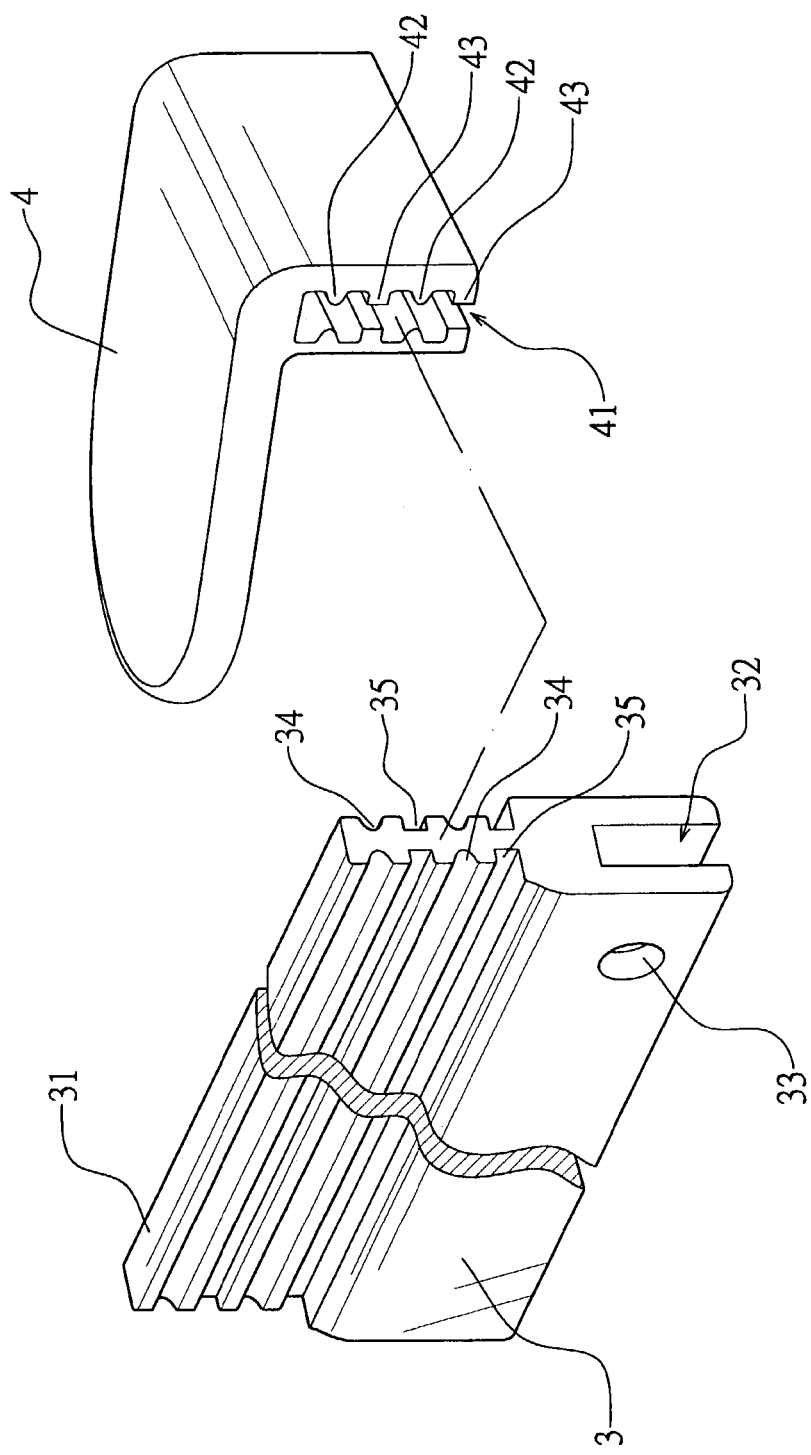
FIG. 4 is a perspective exploded view of a hanging mount and a connection seat of a preferred embodiment in accordance with the present invention.

Referring to FIGS. 2 to 5, a computer monitor screen 200 comprises a screen lens 2, a connection seat 3 having an upper rack 31 and a lower groove 32, a pair of hanging mounts 4, and a plurality of fastening devices 5.

The screen lens 2 has a plurality of through holes 21.

The connection seat 3 further has a plurality of through apertures 33 to match the through holes 21 of the screen lens 2.

The upper rack 31 has a plurality of semicircular recesses 34 and a plurality of rectangular recesses 35.

Each of the hanging mounts 4 has a plurality of semicircular ribs 42 and a plurality of rectangular ribs 43 to define a slide slot 41 to receive the upper rack 31.

The screen lens 2 is inserted in the lower groove 32 of the connection seat 3.

Each of the fastening devices 5 passes through the corresponding through aperture 33 of the connection seat 3 and the corresponding through hole 21 of the screen lens 2 to fasten the connection seat 3 and the screen lens 2.

Each of the hanging mounts 4 has an L shape.

Figure 5:
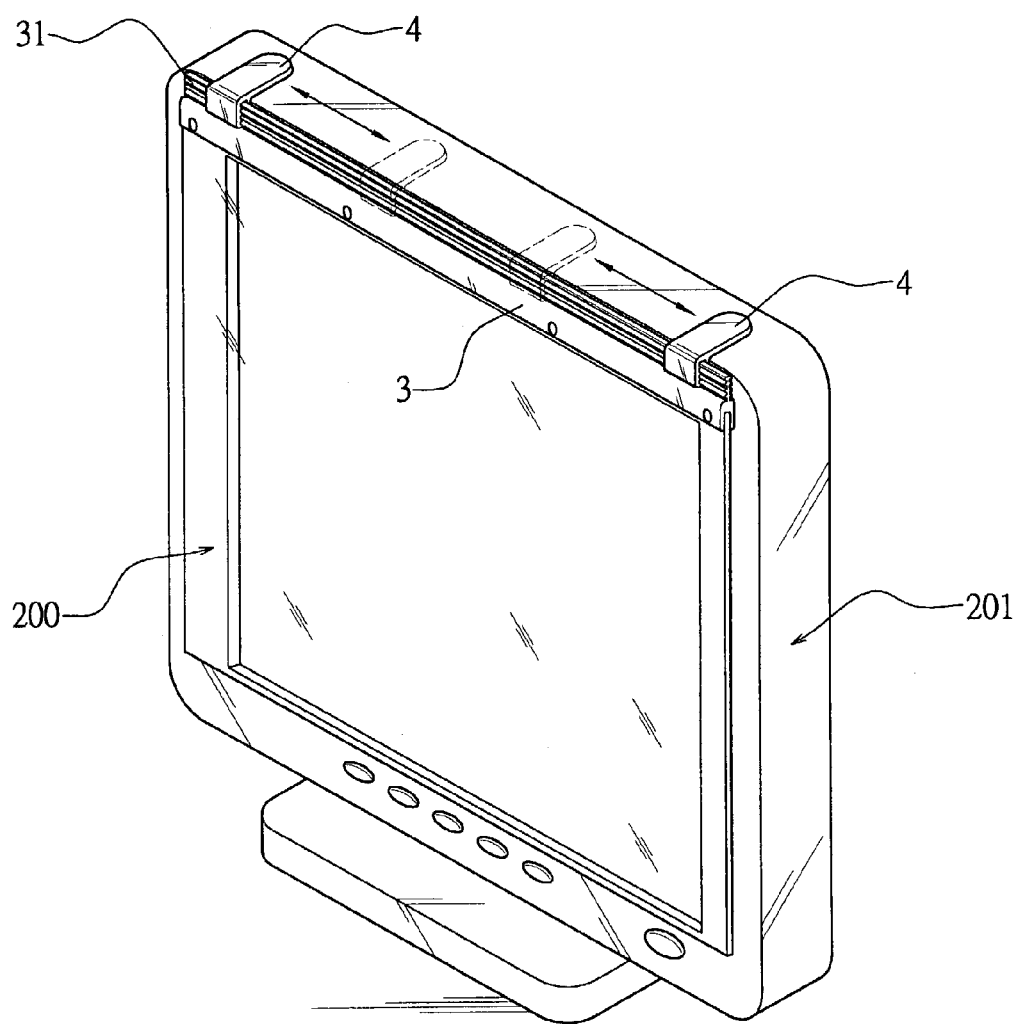
FIG. 5 is a schematic view illustrating an application of a computer monitor screen of a preferred embodiment in accordance with the present invention.

Referring to FIG. 5, the hanging mounts 4 are disposed on a computer monitor 201.

The present invention has the following advantages. The computer monitor screen has one connection seat and two hanging mounts engaging with the connection seat so that the hanging mounts will be moved along the connection seat in order to adjust a distance betwwen the hanging mounts. The computer monitor screen has the upper rack having a plurality of semicircular recesses and a plurality of rectangular recesses and two hanging mounts each having a plurality of semicircular ribs and a plurality of rectangular ribs so that the hanging mounts engaging with the upper rack stably. The upper rack need not be inserted into the corresponding slide slot of each hanging mount to the utmost so that a height of the connection seat will be adjusted.

The present invention is not limited to the above embodiment but various modification thereof may be made. Furthermore, various changes in form and detail may be made without departing from the scope of the present invention.

I claim:
1. A computer monitor screen comprises:
a screen lens, a connection seat having an upper rack and a lower groove, a pair of hanging mounts, and a plurality of fastening devices,
the screen lens having a plurality of through holes,
the connection seat further having a plurality of through apertures to match the through holes of the screen lens,
each of the hanging mounts having a slide slot to receive the upper rack,
the screen lens inserted in the lower groove of the connection seat, and
each of the fastening devices passing through the corresponding through aperture of the connection seat and the corresponding through hole of the screen lens to fasten the connection seat and the screen lens.

2. The computer monitor screen as claimed in claim 1, wherein each of the hanging mounts has an L shape.

3. The computer monitor screen as claimed in claim 1, wherein the upper rack has a plurality of semicircular recesses and a plurality of rectangular recesses.

4. The computer monitor screen as claimed in claim 3, wherein each of the hanging mounts has a plurality of semicircular ribs and a plurality of rectangular ribs.

* * * * *